United States Patent
Sato et al.

(10) Patent No.: US 9,803,102 B2
(45) Date of Patent: Oct. 31, 2017

(54) SLIP PREVENTING AGENT FOR SOCKS

(71) Applicant: NIPPON ZETTOC CO., LTD., Shinjuku-ku, Tokyo (JP)

(72) Inventors: Manami Sato, Tokyo (JP); Kiyomi Nakamura, Tokyo (JP); Satomi Tsubokawa, Tokyo (JP)

(73) Assignee: Nippon Zettoc Co., Ltd., Shinjuku-ku, Tokyo (JP)

( * ) Notice: Subject to any disclaimer, the term of this patent is extended or adjusted under 35 U.S.C. 154(b) by 0 days.

(21) Appl. No.: 15/028,006

(22) PCT Filed: Feb. 23, 2015

(86) PCT No.: PCT/JP2015/055065
§ 371 (c)(1),
(2) Date: Apr. 7, 2016

(87) PCT Pub. No.: WO2015/137104
PCT Pub. Date: Sep. 17, 2015

(65) Prior Publication Data
US 2016/0272838 A1 Sep. 22, 2016

(30) Foreign Application Priority Data

Mar. 13, 2014 (JP) .................. 2014-050893

(51) Int. Cl.
C09D 133/02 (2006.01)
A41B 11/00 (2006.01)
C09J 133/02 (2006.01)
C09J 133/10 (2006.01)

(52) U.S. Cl.
CPC .......... *C09D 133/02* (2013.01); *A41B 11/008* (2013.01); *C09J 133/02* (2013.01); *C09J 133/10* (2013.01)

(58) Field of Classification Search
None
See application file for complete search history.

(56) References Cited

U.S. PATENT DOCUMENTS

| 5,106,625 A * | 4/1992 | Yamamoto | A61K 8/375 424/401 |
| 6,433,054 B1 | 8/2002 | Kawaguchi et al. | |
| 8,097,275 B2 * | 1/2012 | Kanebako | A61K 9/7061 424/447 |

FOREIGN PATENT DOCUMENTS

| CN | 103214980 A | 7/2013 |
| JP | 11-43663 A | 2/1999 |
| JP | 3490580 B | 11/2003 |
| JP | 2013-14871 A | 1/2013 |
| JP | 2013-517357 A | 5/2013 |
| KR | 10-2001-0024016 | 3/2001 |

OTHER PUBLICATIONS

International Search Report mailed by Japan Patent Office dated May 19, 2015 in the corresponding PCT application No. PCT/JP2015/055065.
International Preliminary Report on Patentability dated Sep. 13, 2016 issued in PCT/JP2015/055065.

* cited by examiner

*Primary Examiner* — Vickey Nerangis
(74) *Attorney, Agent, or Firm* — Knobbe, Martens, Olson & Bear, LLP

(57) ABSTRACT

A slip preventing agent for socks of the present invention contains an acrylic acid based polymer, glycerin, and a fatty acid dextrin. It is preferred that an amount of the fatty acid dextrin in the slip preventing agent for socks is in the range of 0.05 to 1 mass %. It is also preferred that an amount of the acrylic acid based polymer in the slip preventing agent for socks is in the range of 0.01 to 10 mass %. It is also preferred that an amount of the glycerin in the slip preventing agent for socks is in the range of 0.1 to 80 mass %. Furthermore, it is also preferred when the amount of the fatty acid dextrin is defined as A [mass %] and the amount of the acrylic acid based polymer is defined as B [mass %], the following relation is satisfied: $0.02 \leq B/A \leq 20$.

9 Claims, No Drawings

SLIP PREVENTING AGENT FOR SOCKS

TECHNICAL FIELD

The present invention relates to a slip preventing agent for socks.

RELATED ART

There is known a slip preventing agent of preventing clothes such as socks and the like from slipping. Such a slip preventing agent is generally constituted of an adhesive composition containing an adhesive component (see Patent Document 1). This slip preventing agent is used by applying to skin, so that the slip of the socks is prevented due to adhesion thereof.

However, a conventional slip preventing agent causes sticky feeling, so that it is difficult to obtain excellent feeling in use. Further, after taking off the socks, since a large amount of an agent (slip preventing agent) remains to adhere to the skin, feeling after the use is not also excellent.

The Patent Document 1 is JP-B 3490580 which is an example of related art.

SUMMARY OF THE INVENTION

It is an object of the present invention to provide a slip preventing agent for socks that is capable of suppressing sticky feeling, thereby providing excellent feeling in use.

Such an object is achieved by the present inventions (1) to (7) described below.

(1) A slip preventing agent, comprising: an acrylic acid based polymer; glycerin; and a fatty acid dextrin.

(2) In the slip preventing agent for socks in the above-mentioned item (1), it is preferred that an amount of the fatty acid dextrin in the slip preventing agent for socks is in the range of 0.05 to 1 mass %.

(3) In the slip preventing agent for socks in the above-mentioned item (1) or (2), it is also preferred that an amount of the acrylic acid based polymer in the slip preventing agent for socks is in the range of 0.01 to 10 mass %.

(4) In the slip preventing agent for socks in any one of the above-mentioned items (1) to (3), it is also preferred that an amount of the glycerin in the slip preventing agent for socks is in the range of 0.1 to 80 mass %.

(5) In the slip preventing agent for socks in any one of the above-mentioned items (1) to (4), it is also preferred that when an amount of the fatty acid dextrin in the slip preventing agent for socks is defined as A [mass %] and an amount of the acrylic acid based polymer in the slip preventing agent for socks is defined as B [mass %], the following relation is satisfied: $0.02 \leq B/A \leq 20$.

(6) In the slip preventing agent for socks in any one of the above-mentioned items (1) to (5), it is also preferred that when an amount of the fatty acid dextrin in the slip preventing agent for socks is defined as A [mass %] and an amount of the glycerin in the slip preventing agent for socks is defined as C [mass %], the following relation is satisfied: $1 \leq C/A \leq 500$.

(7) In the slip preventing agent for socks in any one of the above-mentioned items (1) to (6), it is also preferred that when an amount of the acrylic acid based polymer in the slip preventing agent for socks is defined as B [mass %] and an amount of the glycerin in the slip preventing agent for socks is defined as C [mass %], the following relation is satisfied: $0.5 \leq C/B \leq 5000$.

According to the present invention, it is possible to provide a slip preventing agent for socks that is capable of suppressing sticky feeling, thereby providing excellent feeling in use.

DETAILED DESCRIPTION OF THE PREFERRED EMBODIMENTS

Hereinbelow, description will be made on a slip preventing agent for socks according to the present invention in detail with reference to preferred embodiments.

The slip preventing agent for socks according to the present invention is used by adhering to skin of an user. It is possible to prevent the socks from slipping by intervention of the slip preventing agent for socks between the socks and the skin of the user.

In this regard, a configuration of the slip preventing agent for socks in this specification is not limited particularly. Examples of such a configuration include a liquid-like shape, a gel-like shape, a milky liquid-like shape, a cream-like shape and the like.

The slip preventing agent for socks according to the present invention contains an acrylic acid based polymer, glycerin and a fatty acid dextrin.

Meanwhile, the conventional slip preventing agent causes sticky feeling, so that it is difficult to obtain excellent feeling in use. Further, after taking off the socks, since a large amount of the agent (slip preventing agent) which causes such sticky feeling remains to adhere to the skin, the feeling after the use is not also excellent.

In contrast, the slip preventing agent for socks according to the present invention contains the acrylic acid based polymer, the glycerin and the fatty acid dextrin. Therefore, a viscosity thereof is lowered sufficiently, thereby giving dry touch feeling to the user. As a result, when the slip preventing agent for socks is allowed to adhere to the skin, it is possible to suppress the sticky feeling to be given to the user. In addition, even if the slip preventing agent for socks remains to adhere to the skin after taking off the socks, since the viscosity of the slip preventing agent for socks is low enough, it does not give uncomfortable feeling to the user. Therefore, it is possible to provide the slip preventing agent for socks that is capable of providing the excellent feeling in use.

Hereinafter, description will be made on each component in detail.

[Acrylic Acid Based Polymer]

The acrylic acid based polymer is a component of conferring adhesion to the slip preventing agent for socks.

The acrylic acid based polymer is obtained by copolymerizing an acrylic acid-based alkyl ester having no functional groups as a main component and an acrylic acid-based alkyl ester having functional groups or a monomer component other than the acrylic acid-based alkyl ester.

Examples of the acrylic acid-based alkyl ester having no functional groups include: an acrylic acid alkyl ester or a methacrylic acid alkyl ester such as methyl(metha)acrylate, ethyl(metha)acrylate, propyl(metha)acrylate, buthyl(metha) acrylate, pentyl(metha)acrylate, hexyl(metha)acrylate, heptyl(metha)acrylate, octyl(metha)aclyate, nonyl(metha)acrylate, decyl(metha)acrylate, undecyl(metha)acrylate, and dodecyl(metha)acrylate, which has a carbon number of about 1 to 12; and the like. These materials may be used singly or in combination of two or more of them.

Examples of the acrylic acid-based alkyl ester having the functional groups include: an acrylic acid-based alkyl ester containing a hydroxyl group or an epoxy group such as 2-hydroxyethyl(metha)acrylate, 2-hydroxypropyl(metha)acrylate, glycidyl(metha)acrylate, and the like.

Examples of the monomer component other than the acrylic acid-based alkyl ester include vinyl acetate, styrene, acrylonitrile, N-methylol acrylamide, N,N-dimethyl acrylamide, (metha)acrylamide and the like.

A weight average molecular weight of such an acrylic acid based polymer is preferably in the range of 100,000 to 5,000,000 and more preferably in the range of 500,000 to 3,000,000. The acrylic acid based polymer of which weight average molecular weight falls within the above ranges has adequate adhesion. Therefore, the use of the slip preventing agent for socks containing such an acrylic acid based polymer makes it possible to prevent the socks from slipping more reliably in a state that the user put on the socks. Further, the slip preventing agent for socks containing such an acrylic acid based polymer provides the user with more dry touch feeling.

An amount of the acrylic acid based polymer in the slip preventing agent for socks is preferably in the range of 0.01 to 10 mass % and more preferably in the range of 0.1 to 1 mass %. This makes it possible to efficiently suppress the sticky feeling while the slip preventing agent for socks has the adequate adhesion.

[Glycerin]

The glycerin is a component of contributing to moisture-retaining property of the skin. Further, it is possible for the glycerin to improve the adhesion of the slip preventing agent for socks by mixing the acrylic acid based polymer and the fatty acid dextrin. Moreover, the glycerin is a component of contributing to suppression of the sticky feeling of the slip preventing agent for socks.

An amount of the glycerin in the slip preventing agent for socks is preferably in the range of 0.1 to 80 mass % and more preferably in the range of 1 to 50 mass %. This makes it possible to efficiently suppress the sticky feeling while the slip preventing agent for socks has the adequate adhesion.

When the amount of the acrylic acid based polymer in the slip preventing agent for socks is defined as B [mass %] and the amount of the glycerin in the slip preventing agent for socks is defined as C [mass %], the following relation is satisfied: preferably $0.5 \leq C/B \leq 5000$ and more preferably $1 \leq C/B \leq 500$. By satisfying such a relation, it is possible to efficiently suppress the sticky feeling while the slip preventing agent for socks has the adequate adhesion.

[Fatty Acid Dextrin]

The fatty acid dextrin is a component of contributing to suppression of the sticky feeling of the slip preventing agent for socks by mixing with the glycerin.

A dextrin molecule of such a fatty acid dextrin has characteristics of high adhesion to the skin, a high moisture-retaining effect and high safety to the skin. Therefore, the fatty acid dextrin including such a dextrin molecule also has the same characteristics as the above. Further, since the fatty acid dextrin has an ester group and hydroxyl groups in a molecular structure thereof, the fatty acid dextrin has high compatibility with respect to the acrylic acid based polymer having ester groups and the glycerin having the hydroxyl groups. Therefore, the slip preventing agent for socks containing the acrylic acid based polymer, the glycerin and the fatty acid dextrin is constituted of an uniform composition in the whole thereof. If the slip preventing agent for socks contains the fatty acid dextrin in addition to the glycerin having a relatively high viscosity, it is possible to lower the viscosity thereof sufficiently. Therefore, the slip preventing agent for socks provides with the dry touch feeling, so that it is possible to suppress the sticky feeling to be given to the user.

Examples of the fatty acid dextrin include a palmitinic acid dextrin, an octanoic acid dextrin, myristic acid dextrin, an ethylhexane acid dextrin and the like. These materials may be used singly or in combination of two or more of them. Among them, it is preferable to use an isostearic acid dextrin, particularly. The use of the isostearic acid dextrin as the fatty acid dextrin makes it possible to efficiently suppress the sticky feeling of the slip preventing agent for socks.

A weight average molecular weight of the fatty acid dextrin is preferably in the range of 5,000 to 50,000 and more preferably in the range of 15,000 to 35,000. By using the fatty acid dextrin having the weight average molecular weight which falls within the above ranges, the viscosity of the slip preventing agent for socks becomes low more enough. Therefore, the slip preventing agent for socks gives the more dry touch feeling to the user.

An amount of the fatty acid dextrin in the slip preventing agent for socks is preferably in the range of 0.05 to 1 mass % and more preferably in the range of 0.1 to 0.7 mass %. This makes it possible to efficiently suppress the sticky feeling while the slip preventing agent for socks has the adequate adhesion.

When the amount of the fatty acid dextrin in the slip preventing agent for socks is defined as A [mass %] and the amount of the acrylic acid based polymer in the slip preventing agent for socks is defined as B [mass %], the following relation is satisfied: preferably $0.02 \leq B/A \leq 20$ and more preferably $0.5 \leq B/A \leq 5$. By satisfying such a relation, it is possible to efficiently suppress the sticky feeling while the slip preventing agent for socks has the adequate adhesion.

Further, when the amount of the fatty acid dextrin in the slip preventing agent for socks is defined as A [mass %] and the amount of the glycerin in the slip preventing agent for socks is defined as C [mass %], the following relation is satisfied: preferably $1 \leq C/A \leq 500$ and more preferably $15 \leq C/A \leq 150$. By satisfying such a relation, it is possible to more efficiently suppress the sticky feeling.

[Other Components]

Further, in addition to the above components, a base component and a medical effect component which are generally used depending on an objective and a dosage form may be contained in the slip preventing agent for socks of the present invention.

Examples of such a base component and a medical effect component include a thickener, hyaluronic acid, hyaluronate, an amino acid, a mineral·synthetic oil, animal and plant oil, an alcohol, a surfactant, a wetting agent, a solvent, an antiseptic agent, an antioxidizing agent, a pH adjuster, a perfume material and the like. They are contained in a degree of exerting the effect of the present invention. Examples of them include the followings.

(Thickener)

Examples of the thickener include: alginate and derivatives thereof such as carrageenan (τ, λ, κ), alginic acid, sodium alginate, alginic acid propylene glycol ester, calcium-containing sodium alginate, potassium alginate, calcium alginate, ammonium alginate and the like; xanthan gum; guar gum; cationized guar gum; gelatin; agar; carboxymethylcellulose sodium; hydroxyethyl cellulose; hydroxypropyl methylcellulose; a carboxy vinyl polymer; an acrylic acid-based copolymer; polyacrylamide; hyaluronic acid; sodium hyaluronate; and the like. These materials may be used singly or in combination of two or more of them.

(Amino Acid)

Examples of the amino acid include L-alanine, L-arginine, L-asparagine acid, L-glutamine, L-asparagine, L-cysteine, L-serine, L-tyrosine, L-proline, pyrrolidone carboxylate, glycine, valine, leucine, isoleucine, threonine, methionine, phenylalanine, tryptophan, lycine, cystine, hydroxyproline, hydroxylysine, ornithine, histidine, γ-aminobutyric acid, ε-aminocaproic acid and the like. These materials may be used singly or in combination of two or more of them.

(Mineral.Synthetic Oil)

Examples of the mineral.synthetic oil include a liquid paraffin, a liquid isoparaffin, vaseline, a paraffin, ceresin, a micro crystalline wax, an α-olefin oligomer, polyethylene, polybutene, a synthetic squalane and the like. These materials may be used singly or in combination of two or more of them.

(Animal and Plant Oil)

Examples of the animal and plant oil include squalane, olive oil, camellia oil, wheat germ oil, jojoba oil, avocado oil, carrot oil, shea oil, liquid-like shea oil, palm oil, palm kernel oil, hardened oil, horse oil, lanolins, egg-yolk oil, oil of cloves, rose hip oil, lavender oil, peppermint oil, spearmint oil, rosemary oil, macadamia nut oil, apricot kernel oil, safflower oil, safflower oil (2), sunflower oil, sunflower oil (2), meadowfoam oil, oil of almonds, perilla oil, sesame oil, borage oil, cacao oil, rice bran oil, rice germ oil, fennel oil, orange oil, chamomile oil, cucumber oil, lumbang oil, soy oil, tea tree oil, corn oil, rape oil, persic oil, castor oil, cotton oil, peanut oil, turtle oil, mink oil, argania spinosa oil, crambe abyssinica oil, almond oil, peach kernel oil, grape seed oil, emu oil, cannabis sativa seed oil, linseed oil, camellia oil, Japan wax, copra oil, evening primrose oil, pistachio seed oil, mango butter and the like. These materials may be used singly or in combination of two or more of them.

(Alcohol)

Examples of the alcohol include ethanol, isopropanonl, butyl alcohol, benzyl alcohol, lauryl alcohol, myristyl alcohol, cetanol, cetostearyl alcohol, stearyl alcohol, isostearyl alcohol, oleyl alcohol, hexyl decanol, behenyl alcohol, octyl dodecanol, lanolin alcohol, cholesterol, phytosterol, 2-hexyl decanol, 2-octyl dodecanol, batyl alcohol and the like. These materials may be used singly or in combination of two or more of them.

(Ester Oil)

Examples of the ester oil include glyceryl tricaprinate, glyceryl tri-2-ethyl hexanoate, isononyl isononate, ethylene glycol dioctanoate, glyceryl tri(capryl.caprylate), isopropyl myristate, butyl myristate, isopropyl palmitate, ethyl stearate, butyl stearate, ethyl oleate, ethyl linoleate, isopropyl linoleate, cetyl caprylate, decyl myristate, hexyl laurate, myristyl myristate, cetyl myristate, cetyl palmitate, stearyl stearate, oleyl oleate, decyl oleate, cetyl ricinoleate, isostearyl laurate, isotridecyl myristate, isocetyl myristate, isostearyl myristate, 2-octyldodecyl myristate, ethylhexyl palmitate, isocetyl palmitate, ethylhexyl stearate, isocetyl stearate, isodecyl oleate, 2-octyldodecyl oleate, 2-octyldodecyl ricinoleate, ethyl isostearate, isopropyl isostearate, cetyl octanoate, cetostearyl octanoate, stearyl octanoate, hexyl isostearate, ethylene glycol dioleate, propylene glycol dicaprate, di(capryl.capric acid) propylene glycol, propylene glycol dioleate, neopentyl glycol dicaprate, neopentyl glycol di-2-ethyl hexanoate, glyceryl triundecylate, glyceryl triisopalmitate, glyceryl triisostearate, trimethylol propane tri-2-ethyl hexanoate, trimethylol propane triisostearate, pentaerythritol tetra-2-ethyl hexanoate, pentaerythritol tetramyristate, pentaerythritol tetraisostearate, 2-octyldodecyl neopentanoate, isocetyl octanoate, isostearyl octanoate, ethylhexyl isopelargonate, 2-hexyldecyl neodecanoate, 2-octyldodecyl neodecanoate, ethylhexyl isopalmitate, isocetyl isostearate, isostearyl isostearate, 2-octyldodecyl isostearate, lauryl lactate, myristyl lactate, cetyl lactate, 2-octyldodecyl lactate, triethyl citrate, acetyltriethyl citrate, acetyltributyl citrate, tri-2-ethylhexyl citrate, triisocetyl citrate, tri-2-octyldodecyl citrate, diisostearyl malate, 2-ethylhexyl hydroxyl-stearate, dioctyl succinate, diisopropyl adipate, diisobutyl adipate, dioctyl adipate, diethyl sebacate, diisopropyl sebacate, dioctyl sebacate, dibutyloctyl sebacate, cholesteryl stearate, cholesteryl isostearate, cholesteryl hydroxystearate, cholesteryl oleate, dihydro-cholesteryl oleate, phytosteryl isostearate, phytosteryl oleate, hexyldecyl dimethyl-octanoate, cetyl lactate, diethyl phthalate, dibutyl phthalate, dialkyl carbonate and the like. These materials may be used singly or in combination of two or more of them.

(Surfactant)

Examples of the surfactant include lauryl sulfate, alkyl sulfate, polyoxyethylene alkyl sulfate, tetradecen sulfonate, polyoxyethylene alkyl sulfosuccinate, lauroyl sarcosylate, an alkylmethyl-β-alanin salt, polyoxyethylene alkylether phosphate, a fatty acid soap, N-acyl glutamate, lauric acid diethanolamide, palm oil fatty acid diethanolamide, alkyldimethyl amine oxide, an alkylmethyl taurine salt, alkyl amino procyonate, polyoxyethylene alkylether carbonate, alkyl phosphate, alkylglucoside, polyether modified-silicone, chloride alkyltrimethyl ammonium, bromide alkyltrimethyl ammonium, amideamine, betaine chloride dialkyldimethyl ammonium dimethyl acetate, alkylamide propylbetaine, alkylcrboxymethyl hydroxyethyl imidasolinium betaine, lecithin (soy phospholipid, egg yolk lecithin) and derivatives thereof (hydrogenated egg yolk lecithin, hydrogenated soy phospholipid, egg yolk lysophosphatidyl choline, soy lysophospholipid liquid, hydrogenated soy lysophospholipid, hydrogenation soy phospholipid), propylene glycol fatty acid ester, glycerine fatty acid ester, polyglycerine fatty acid ester, polyoxyethylene glycerine fatty acid ester, sorbitan fatty acid ester, polyoxyethlene sorbitan fatty acid ester, polyoxyethylene sorbitol fatty acid ester, polyoxyethylene lanoline, polyoxyethylene lanoline alcohol, polyoxyethylene sorbitol yellow beeswax, polyoxyethyele hydrogenated castor oil, polyoxyethylene phytosterol, polyethylene glycol fatty acid ester, polyoxyethylene polyoxypropylene glycol, polyoxyethylene alkylether, polyoxypropylene alkylether, polyoxyethylene polyoxypropylene alkylether, polyoxyethylene alkylnonylether, polyoxyethylene alkylether phosphoric acid·phosphate, sucrose fatty acid ester and the like. These materials may be used singly or in combination of two or more of them.

These surfactants are mainly used as an emulsifying agent or a solubilizing agent, but may be used as a moisturizing component. In the case where they are used as the moisturizing component, a non-ionic surfactant being an EO adduct of the plant oil is particularly excellent. Such a non-ionic surfactant is used singly or in combination of two or more thereof. Among the above non-ionic surfactants, the polyoxyethylen glycerine fatty acid ester, polyoxyethyelen hydrogenated castor oil, and polyoxyethylene polyoxypropylene glycol are used preferably.

(Wetting Agent)

Examples of the wetting agent include: polyalcohol such as diglycerine, sorbitol liquid, polyethylene glycol, propylene glycol, dipropylene glycol, 1,3-butylene glycol and the like, other than the above glycerine; ethylene oxide; ethylene glycol monoethyl ether; ethylene glycol monobuthyl ether; diethylene glycol monoethyl ether; propylene oxide; polyoxyalkylene alkylether; and the like. These materials may be used singly or in combination of two or more of them.

(Solvent)

Examples of the solvent include: purified water, normal water, isopropanol, benzylalcohol and the like. These materials may be used singly or in combination of two or more of them.

(Antiphlogistine)

Examples of the antiphlogistine include glycyrrhizinic acid, dipotassium glycyrrhizinate, monoammonium glycyrrhizinate, glycyrrhetinic acid, stearyl glycyrrhetinate, guaiazulene, sodium guaiazulene sulfonate, allantoin, ∈-aminocaproic acid, and the like. These materials may be used singly or in combination of two or more of them.

(Antiseptic Agent)

Examples of the antiseptic agent include methylparaben, ethylparaben, propylparaben, buthylparaben, isobuthylparaben, phenoxyethanol, bisasbolol, hinokitiol, benzoic acid, sodium benzoate, salicylic acid, sodium salicylate, sorbic acid, potassium sorbate, undecylenic acid, pionin, 1-menthol, d-camphor, isopropylmethyl phenol, benzethonium chloride, alkyldiamino ethylglycine hydrochloride, and the like. These materials may be used singly or in combination of two or more of them.

(Antioxidizing Agent)

Examples of the antioxidizing agent include dibutylhydroxyl toluene, butylhydroxyl anisole, erythorbic acid, propyl gallate, ascorbic acid, derivatives of the ascorbic acid, d-δ-tocopherol, and the like. These materials may be used singly or in combination of two or more of them.

(pH Adjuster)

Examples of the pH adjuster include sodium hydroxide, potassium hydroxide, L-arginine, triethanol amine, diethanol amine, citric acid, glycolic acid, malic acid, tartaric acid, lactic acid, succinic acid, phosphoric acid, salts thereof and the like. These materials may be used singly or in combination of two or more of them.

(Perfume Material)

Examples of the perfume material include: various kinds of the perfume material which are known as a natural perfume material such as rose oil, mint oil and the like; a perfume material isolated from the natural perfume material; and a synthetic perfume material such as ethyl acetoacetate and the like. These materials may be used singly or in combination of two or more of them. By using the slip preventing agent for socks containing the perfume material, even if the user remains to put on his socks for a long period of time, it is possible to suppress foot's smell of the user.

In the case where the slip preventing agent for socks containing the various kinds of the above components is used in a liquid state, the viscosity of the slip preventing agent for socks is not limited particularly. In this regard, the viscosity of the slip preventing agent for socks which is measured at 25° C. by using a B-type viscometer (rotation number: 10 rmp) is preferably in the range of 10,000 to 70,000 mPa·s and more preferably in the range of 30,000 to 50,000 mPa·s. If the viscosity of the slip preventing agent for socks falls within the above range, it is possible to reliably suppress the sticky feeling to be given to the user, thereby giving the more dry touch feeling to the user.

The slip preventing agent for socks of the present invention has been described. However, the present invention is not limited thereto.

For example, the slip preventing agent for socks of the present invention may contain any component other than the components described above as the components constituting the slip preventing agent for socks.

EXAMPLES

Next, description will be made on concrete examples of the invention.

Example 1

A gel-like slip preventing agent for socks was produced by using each component 1 to 13 having an amount shown in Table 1 as follows.

First, glycerin of 15 mass % (component 2), dextrin isostearate of 0.05 mass % (component 3), polyoxyethylene hydrogenated castor oil of 0.2 mass % (component 4), squalane of 1 mass % (component 5), shea oil of 0.1 mass % (component 6), stearyl alcohol of 1 mass % (component 7), dipropylene glycol of 5 mass % (component 8) with respect to a total mass of the finally-produced slip preventing agent for socks were added into a first container. Thereafter, the first container are uniformly heated and mixed at 80° C. to thereby obtain a mixture 1.

Next, purified water of 60 mass % (component 13), which was heated at 80° C., and an acrylic acid-methacrylic acid alkylcopolymer of 0.5 mass % (component 1) were added to a second container which was different from the first container to obtain a mixture 2.

Next, the mixture 2 was gradually added to the first container. Thereafter, it was cooled until a temperature inside the first container became 60° C. Next, L-arginine of 0.3 mass %, which was dissolved with a moderate amount of the purified water, was added into the container to thereby mix the mixture 1, mixture 2 and component 9, uniformly. Thus, a mixture 3 was obtained.

Next, phenoxyethanol of 0.5 mass % (component 10) and glycerin mono-2-ethylhexyl ether of 0.1 mass % (component 11) were added into the first container to uniformly mix the mixture 3, component 10 and component 11. Next, it was cooled until a temperature inside the first container became the vicinity of room temperature. Thereafter, sodium hyaluronate of 0.001 mass % (component 12), which was dissolved with a moderate amount of the purified water, was added into the first container. In addition to that, the purified water (component 13) was added into the first container so that an amount of the purified water became 76.24 mass % with respect to the total amount of the finally-produced slip preventing agent for socks. Thereafter, the mixture 3, component 10, component 11, component 12 and component 13 were mixed uniformly. Thus, the slip preventing agent for socks was obtained.

Examples 2 to 5

In each of the Examples 2 to 5, a gel-like slip preventing agent for socks was produced in the same manner as the Example 1, except that components 1 to 13 each having an amount shown in Table 1 were used.

Example 6

A gel-like slip preventing agent for socks was produced with components having amounts below by using an ordinary method.

Acrylic acid-methacrylic acid alkylcopolymer: 0.6 mass %
Glycerin: 20.0 mass %
Dextrin isostearate: 0.5 mass %
Polyoxyethylene polyoxypropylene decyltetradecyl ether: 0.3 mass %
Liquid paraffin: 0.1 mass %
Cetanol: 0.1 mass %
Sodium hydroxide: 0.06 mass %
p-Hydroxybenzoate ester: 0.5 mass %
Purified water 77.84 mass %

More specifically, first, the glycerin of 20.0 mass %, the dextrin isostearate of 0.5 mass %, the cetanol of 0.1 mass %, the polyoxyethylene polyoxypropylene decyltetradecyl ether of 0.3 mass %, the liquid paraffin of 0.1 mass %, and the p-hydroxybenzoate ester of 0.5 mass % with respect to a total mass of the finally-produced slip preventing agent for socks were added into a first container. Thereafter, the first container are uniformly heated and mixed at 80° C. to thereby obtain a mixture 1.

Next, the purified water of 60 mass %, which was heated at 80° C., and the acrylic acid-methacrylic acid alkylcopolymer of 0.6 mass % were added to a second container which was different from the first container to obtain a mixture 2.

Next, the mixture 2 was gradually added to the first container to uniformly mix the mixture 1 and mixture 2. Thereafter, it was cooled until a temperature inside the first container became 60° C. Next, the sodium hydroxide of 0.06 mass %, which was dissolved with a moderate amount of the purified water, was added into the first container to thereby obtain a mixture 3.

Next, it was cooled until a temperature inside the first container became the vicinity of room temperature. Thereafter, the purified water was added into the first container so that an amount of the purified water became 77.84 mass % with respect to the total amount of the finally-produced slip preventing agent for socks. Moreover, these were mixed uniformly. Thus, the slip preventing agent for socks was obtained.

Example 7

A gel-like slip preventing agent for socks was produced with components having amounts below by using an ordinary method.

Acrylic acid-methacrylic acid alkylcopolymer: 0.5 mass %
Glycerin: 15.0 mass %
Dextrin isostearate: 0.3 mass %
Polyoxyethylene hydrogenated castor oil: 0.2 mass %
Squalane: 1.0 mass %
Shea oil: 0.1 mass %
Stearyl alcohol: 1.0 mass %
Dipropylene glycol: 5.0 mass %
L-arginine: 0.3 mass %
Phenoxyethanol: 0.5 mass %
Glycerin mono-2-ethylhexyl ether: 0.1 mass %
Sodium hyaluronate: 0.001 mass %
Purified water 75.99 mass %

More specifically, the slip preventing agent for socks was produced in the same manner as the first embodiment, except that an amount of the dextrin isostearate was 0.3 mass % with respect to a total amount of the finally-produced slip preventing agent for socks.

Example 8

A gel-like slip preventing agent for socks was produced with components having amounts below by using an ordinary method.

Acrylic acid-methacrylic acid alkylcopolymer: 0.25 mass %
Carboxy vinyl polymer: 0.15 mass %
Glycerin: 12.0 mass %
Dextrin isostearate: 0.5 mass %
Polyoxyethylene hydrogenated castor oil: 0.5 mass %
Jojoba oil: 2.0 mass %
Cetostearyl alcohol: 0.5 mass %
1,3-butylene glycol: 15.0 mass %
Triethanol amine: 0.5 mass %
Phenoxy ethanol: 0.5 mass %
Purified water: 68.1 mass %

More specifically, first, the glycerin of 12.0 mass %, the dextrin isostearate of 0.5 mass %, the polyoxyethylene hydrogenated castor oil of 0.5 mass %, the jojoba oil of 2.0 mass %, the cetostearyl alcohol of 0.5 mass %, and the 1,3-butylene glycol of 15.0 mass % with respect to a total mass of the finally-produced slip preventing agent for socks were added into a first container. Thereafter, the first container were uniformly heated and mixed at 80° C. to thereby obtain a mixture 1.

Next, the purified water of 50 mass %, which was heated at 80° C., the acrylic acid-methacrylic acid alkylcopolymer of 0.25 mass % and the carboxy vinyl polymer of 0.15 mass % were added into a second container which was different from the first container to obtain a mixture 2.

Next, the mixture 2 was gradually added to the first container. Thereafter, it was cooled until a temperature inside the first container became 60° C. Next, the triethanol amine of 0.5 mass % was added into the first container to thereby mix the mixture 1, the mixture 2 and the triethanol amine, uniformly. Thus, a mixture 3 was obtained.

Next, the phenoxy ethanol of 0.5 mass % was added into the first container and the purified water was added into the first container so that an amount of the purified water became 68.1 mass % with respect to the total amount of the finally-produced slip preventing agent for socks. Thereafter, these were mixed uniformly. Next, it was cooled until a temperature inside the first container became the vicinity of room temperature. Thus, the slip preventing agent for socks was obtained.

Example 9

A cream-like slip preventing agent for socks was produced with components having amounts below by using an ordinary method.

Acrylic acid-methacrylic acid alkylcopolymer: 0.6 mass %
Glycerin: 10.0 mass %
1,3-butylene glycol: 7.0 mass %
Dextrin isostearate: 0.2 mass %
Hydrogenated soybean phospholipid: 0.3 mass %
Lipophilic monostearic acid glyceryl: 0.3 mass %
Glycerin fatty acid ester: 1.0 mass %
Polyoxyethlene behenyl ether: 1.4 mass %
Isopropyl palmitate: 3.0 mass %
Squalan: 5.0 mass %
Sunflower oil (1): 1.0 mass %
Tri(capryl-capric acid)glyceryl: 5.0 mass %
Cyclopentasiloxane: 0.2 mass %
Cetostearyl alcohol: 0.8 mass %
Behenyl alcohol: 2.0 mass %
L-arginine: 0.5 mass %
p-Hydroxybenzoate ester: 0.2 mass %
Phenoxy ethanol: 0.3 mass %
Purified water: 61.2 mass %

More specifically, first, the glycerin of 10.0 mass %, the dextrin isostearate of 0.2 mass %, the hydrogenated soybean phospholipid of 0.3 mass %, the lipophilic monostearic acid glyceryl of 0.3 mass %, the glycerin fatty acid ester of 1.0 mass %, the isopropyl palmitate of 3.0 mass %, the squalan of 5.0 mass %, the sunflower oil (1) of 1.0 mass %, the 1,3-butylene glycol of 7.0 mass %, the tri(capryl-capric acid)glyceryl of 5.0 mass %, the cyclopentasiloxane of 0.2 mass %, the cetostearyl alcohol of 0.8 mass %, the behenyl alcohol of 2.0 mass %, the polyoxyethlene behenyl ether of 1.4 mass %, and the p-hydroxybenzoate ester of 0.2 mass % with respect to a total mass of the finally-produced slip preventing agent for socks were added into a first container. Thereafter, the first container were uniformly heated and mixed at 80° C. to thereby obtain a mixture 1.

Next, the purified water of 50 mass %, which was heated at 80° C., and the acrylic acid-methacrylic acid alkylcopolymer of 0.6 mass % were added into a second container which was different from the first container to obtain a mixture 2.

Next, the mixture 2 was gradually added to the first container. Thereafter, it was cooled until a temperature inside the first container became 60° C. Next, L-arginine of 0.5 mass %, which was dissolved with a moderate amount of the purified water, was added into the first container to thereby mix the mixture 1, the mixture 2 and the L-arginine, uniformly. Thus, a mixture 3 was obtained.

Next, the phenoxy ethanol of 0.3 mass % was added into the first container and the purified water was added into the first container so that an amount of the purified water became 61.2 mass % with respect to the total amount of the finally-produced slip preventing agent for socks. Thereafter, these were mixed uniformly. Next, it was cooled until a temperature inside the first container became the vicinity of room temperature. Thus, the slip preventing agent for socks was obtained.

Example 10

A cream-like slip preventing agent for socks was produced with components having amounts below by using an ordinary method.

Acrylic acid-methacrylic acid alkylcopolymer: 0.4 mass %
Carboxy vinyl polymer: 0.2 mass %
Glycerin: 10.0 mass %
1,3-butylene glycol: 5.0 mass %
Dipropylene glycol: 10.0 mass %
Dextrin isostearate: 0.5 mass %
Self emulsifying-type glyceryl monostearate: 1.0 mass %
Sorbitan sesquioleate: 0.7 mass %
Polyoxyethlene coconut oil fatty acid sorbitan: 1.5 mass %
Polyoxyethylene sorbitan monostearate: 2.0 mass %
Isopropyl myristate: 5.0 mass %
Squalan: 2.0 mass %
Tri(capryl-capric acid)glyceryl: 3.0 mass %
Behenyl alcohol: 2.0 mass %
Potassium hydroxide: 0.07 mass %
p-Hydroxybenzoate ester: 0.6 mass %
Purified water: 56.03 mass %

More specifically, first, the glycerin of 10.0 mass %, the dextrin isostearate of 0.5 mass %, the self emulsifying-type glyceryl monostearate of 1.0 mass %, the sorbitan sesquioleate of 0.7 mass %, the plyoxyethlene coconut oil fatty acid sorbitan of 1.5 mass %, the polyoxyethylene sorbitan monostearate of 2.0 mass %, the squalan of 2.0 mass %, the isopropyl myristate of 5.0 mass %, the 1,3-butylene glycol of 5.0 mass %, the dipropylene glycol of 10.0 mass %, the tri(capryl-capric acid)glyceryl of 3.0 mass %, the behenyl alcohol of 2.0 mass %, and the p-hydroxybenzoate ester of 0.6 mass % with respect to a total mass of the finally-produced slip preventing agent for socks were added into a first container. Thereafter, the first container were uniformly heated and mixed at 80° C. to thereby obtain a mixture 1.

Next, the purified water of 40 mass %, which was heated at 80° C., the acrylic acid-methacrylic acid alkylcopolymer of 0.4 mass % and the carboxy vinyl polymer of 0.2 mass % were added into a second container which was different from the first container to obtain a mixture 2.

Next, the mixture 2 was gradually added to the first container to uniformly mix the mixture 1 and mixture 2. Thereafter, it was cooled until a temperature inside the first container became 60° C. Next, the potassium hydroxide of 0.07 mass %, which was dissolved with a moderate amount of the purified water, was added into the first container. Thus, a mixture 3 was obtained.

Next, it was cooled until a temperature inside the first container became the vicinity of room temperature. Thereafter, the purified water was added into the first container so that an amount of the purified water became 56.03 mass % with respect to the total amount of the finally-produced slip preventing agent for socks. Moreover, these were mixed uniformly. Thus, the slip preventing agent for socks was obtained.

Example 11

A liquid-like slip preventing agent for socks was produced with components having amounts below by using an ordinary method.

Acrylic acid-methacrylic acid alkylcopolymer: 0.2 mass %
Glycerin: 15.0 mass %
Dextrin isostearate: 0.2 mass %
Polyoxyethylene alkyl(carbon number: 12 to 15)ether phosphoric acid: 0.2 mass %
Ethanol: 10.0 mass %
Macadamia nut oil: 0.1 mass %
Sodium hydroxide: 0.02 mass %
p-Hydroxybenzoate ester: 0.3 mass %
Perfume material: 0.05 mass %
Purified water: 73.93 mass %

More specifically, first, the glycerin of 15.0 mass %, the dextrin isostearate of 0.2 mass %, the polyoxyethylene alkylether phosphoric acid of 0.2 mass %, the ethanol of 10.0 mass %, the macadamia nut oil of 0.1 mass %, and the p-hydroxybenzoate ester of 0.3 mass % with respect to a total mass of the finally-produced slip preventing agent for socks were added into a first container. Thereafter, the first container were uniformly heated and mixed at 80° C. to thereby obtain a mixture 1.

Next, the purified water of 60 mass %, which was heated at 80° C., and the acrylic acid-methacrylic acid alkylcopolymer of 0.2 mass % were added into a second container which was different from the first container to obtain a mixture 2.

Next, the mixture 2 was gradually added to the first container to uniformly mix the mixture 1 and mixture 2. Thereafter, it was cooled until a temperature inside the first container became 60° C. Next, the sodium hydroxide of 0.02 mass %, which was dissolved with a moderate amount of the purified water, was added into the first container. Thus, a mixture 3 was obtained.

Next, it was cooled until a temperature inside the first container became the vicinity of room temperature. Thereafter, the perfume material of 0.05 mass % was added into the first container and the purified water was added into the first container so that an amount of the purified water became 73.93 mass % with respect to the total amount of the finally-produced slip preventing agent for socks. Moreover, these were mixed uniformly. Thus, the slip preventing agent for socks was obtained.

Comparative Examples 1 to 7

In each of the Comparative Examples 1 to 7, a gel-like slip preventing agent for socks was produced in the same manner as the Example 1, except that components 1 to 13 each having an amount shown in Table 1 were used.

The components and the amounts of the Examples 1 to 5 and the Comparative Examples 1 to 7 are shown in Table 1.

<Evaluations>

[Evaluations of Effects of Preventing Slip of Socks and Feeling in Use (Sticky Feeling)]

A questionnaire survey including a question "Do you worry about the slip of the socks?" was carried out to people. Thereafter, 10 people (panelists) were selected, who had an answer "I worry about the slip of the socks" to the question in the questionnaire survey. These 10 panelists used the slip preventing agents for socks which were prepared in the Examples 1 to 11 and the Comparative Examples 1 to 7. Thereafter, the slip preventing agents for socks were evaluated according to the following criteria. The followings are evaluation criteria.

Effect of Preventing Slip of Socks

A: Subjects who felt that the slip of the socks was improved were 8 or more.

B: Subjects who felt that the slip of the socks was improved were 5 to 7.

C: Subjects felt that the slip of the socks was improved were 4 or less.

TABLE 1

| Components | Component names | Ex. 1 [mass %] | Ex. 2 [mass %] | Ex. 3 [mass %] | Ex. 4 [mass %] | Ex. 5 [mass %] | Com. Ex. 1 [mass %] | Com. Ex. 2 [mass %] |
|---|---|---|---|---|---|---|---|---|
| 1 | Acrylic acid-methacrylic acid alkylcopolymer | 0.5 | 0.5 | 0.5 | 0.5 | 0.5 | 0.01 | 0.1 |
| 2 | Glycerin | 15 | 15 | 15 | 15 | 15 | 50 | 30 |
| 3 | Dextrin isostearate | 0.05 | 0.1 | 0.3 | 0.7 | 1 | — | — |
| 4 | Polyoxyethylene hydrogenated castor oil | 0.2 | 0.2 | 0.2 | 0.2 | 0.2 | 0.2 | 0.2 |
| 5 | Squalane | 1 | 1 | 1 | 1 | 1 | 1 | 1 |
| 6 | Shea oil | 0.1 | 0.1 | 0.1 | 0.1 | 0.1 | 0.1 | 0.1 |
| 7 | Stearyl alcohol | 1 | 1 | 1 | 1 | 1 | 1 | 1 |
| 8 | Dipropylene glycol | 5 | 5 | 5 | 5 | 5 | 5 | 5 |
| 9 | L-arginine | 0.3 | 0.3 | 0.3 | 0.3 | 0.3 | 0.006 | 0.06 |
| 10 | Phenoxyethanol | 0.5 | 0.5 | 0.5 | 0.5 | 0.5 | 0.5 | 0.5 |
| 11 | Glycerin mono-2-ethylhexyl ether | 0.1 | 0.1 | 0.1 | 0.1 | 0.1 | 0.1 | 0.1 |
| 12 | Sodium hyaluronate | 0.001 | 0.001 | 0.001 | 0.001 | 0.001 | 0.001 | 0.001 |
| 13 | Purified water | Remaining amount | Remaining amount | Remaining amount | Remaining amount | Remaining amount | Remaining amount | Remaining amount |

| Components | Component names | Com. Ex. 3 [mass %] | Com. Ex. 4 [mass %] | Com. Ex. 5 [mass %] | Com. Ex. 6 [mass %] | Com. Ex. 7 [mass %] |
|---|---|---|---|---|---|---|
| 1 | Acrylic acid-methacrylic acid alkylcopolymer | 0.5 | 1 | 5 | — | 0.5 |
| 2 | Glycerin | 15 | 15 | 15 | 15 | — |
| 3 | Dextrin isostearate | — | — | — | 0.3 | 0.3 |
| 4 | Polyoxyethylene hydrogenated castor oil | 0.2 | 0.2 | 0.2 | 0.2 | 0.2 |
| 5 | Squalane | 1 | 1 | 1 | 1 | 1 |
| 6 | Shea oil | 0.1 | 0.1 | 0.1 | 0.1 | 0.1 |
| 7 | Stearyl alcohol | 1 | 1 | 1 | 1 | 1 |
| 8 | Dipropylene glycol | 5 | 5 | 5 | 5 | 5 |
| 9 | L-arginine | 0.2 | 0.6 | 3 | — | 0.3 |
| 10 | Phenoxyethanol | 0.5 | 0.5 | 0.5 | 0.5 | 0.5 |
| 11 | Glycerin mono-2-ethylhexyl ether | 0.1 | 0.1 | 0.1 | 0.1 | 0.1 |
| 12 | Sodium hyaluronate | 0.001 | 0.001 | 0.001 | 0.001 | 0.001 |
| 13 | Purified water | Remaining amount | Remaining amount | Remaining amount | Remaining amount | Remaining amount |

Evaluation of Feeling in Use (Sticky Feeling)

A: The slip preventing agents for socks did not give the sticky feeling to subjects and the subjects who felt the excellent feeling in use were 8 or more.

B: The slip preventing agents for socks did not give the sticky feeling to subjects and the subjects who felt the excellent feeling in use were 5 to 7.

C: The slip preventing agents for socks did not give the sticky feeling to subjects and the subjects who felt the excellent feeling in use were 3 to 4.

D: The slip preventing agents for socks did not give the sticky feeling to subjects and the subjects who felt the excellent feeling in use were 2 or less.

These results are shown in Table 2.

TABLE 2

Table 2

|  | Effect of Preventing Slip of Socks | Feeling in Use |
| --- | --- | --- |
| Ex. 1 | A | B |
| Ex. 2 | A | B |
| Ex. 3 | A | A |
| Ex. 4 | A | B |
| Ex. 5 | A | B |
| Ex. 6 | A | A |
| Ex. 7 | A | A |
| Ex. 8 | A | A |
| Ex. 9 | A | A |
| Ex. 10 | A | A |
| Ex. 11 | A | A |
| Com. Ex. 1 | C | D |
| Com. Ex. 2 | B | D |
| Com. Ex. 3 | A | D |
| Com. Ex. 4 | B | D |
| Com. Ex. 5 | A | D |
| Com. Ex. 6 | C | C |
| Com. Ex. 7 | C | C |

As seen from Table 2 clearly, the slip preventing agent for socks of the present invention had excellent effects of preventing the slip of the socks. Further, in the slip preventing agent for socks of the present invention, the sticky feeling was suppressed. In contrast, the Comparative Examples could not obtain sufficient results.

What is claimed is:

1. A slip preventing agent for socks providing dry touch feeling to a user comprising:
an acrylic acid polymer;
glycerin; and
a fatty acid dextrin,
wherein when an amount of the acrylic acid polymer in the slip preventing agent for socks is defined as B [mass %] and an amount of the glycerin in the slip preventing agent for socks is defined as C [mass %], the following relation is satisfied: $50/3 \leq C/B \leq 75$.

2. The slip preventing agent for socks of claim 1, wherein an amount of the fatty acid dextrin in the slip preventing agent for socks is in the range of 0.05 to 1 mass %.

3. The slip preventing agent for socks of claim 1, wherein an amount of the acrylic acid polymer in the slip preventing agent for socks is in the range of 0.01 to 10 mass %.

4. The slip preventing agent for socks of claim 1, wherein an amount of the glycerin in the slip preventing agent for socks is in the range of 0.1 to 80 mass %.

5. The slip preventing agent for socks of claim 1, when an amount of the fatty acid dextrin in the slip preventing agent for socks is defined as A [mass %] and an amount of the acrylic acid polymer in the slip preventing agent for socks is defined as B [mass %], the following relation is satisfied: $0.02 \leq B/A \leq 20$.

6. The slip preventing agent for socks of claim 1, when an amount of the fatty acid dextrin in the slip preventing agent for socks is defined as A [mass %] and an amount of the glycerin in the slip preventing agent for socks is defined as C [mass %], the following relation is satisfied: $1 \leq C/A \leq 500$.

7. The slip preventing agent for socks of claim 1, wherein the fatty acid dextrin is dextrin isostearate and wherein an amount of the fatty acid dextrin in the slip preventing agent for socks is in the range of 0.05 to 1 mass %.

8. The slip preventing agent for socks of claim 1, wherein an amount of the acrylic acid polymer in the slip preventing agent for socks is in the range of 0.1 to 1 mass % and wherein an amount of the glycerin in the slip preventing agent for socks is in the range of 1 to 50 mass %.

9. The slip preventing agent for socks of claim 1, wherein a viscosity of the slip preventing agent for socks measured under a condition in which a temperature is 25° C. and a rotation number is 10 rmp by using a B-type viscometer is in the range of 10,000 to 70,000 mPa·s.

* * * * *